Nov. 8, 1949     A. S. NEWTON     2,487,360
NITROGEN PURIFICATION PROCESS
Filed March 3, 1945
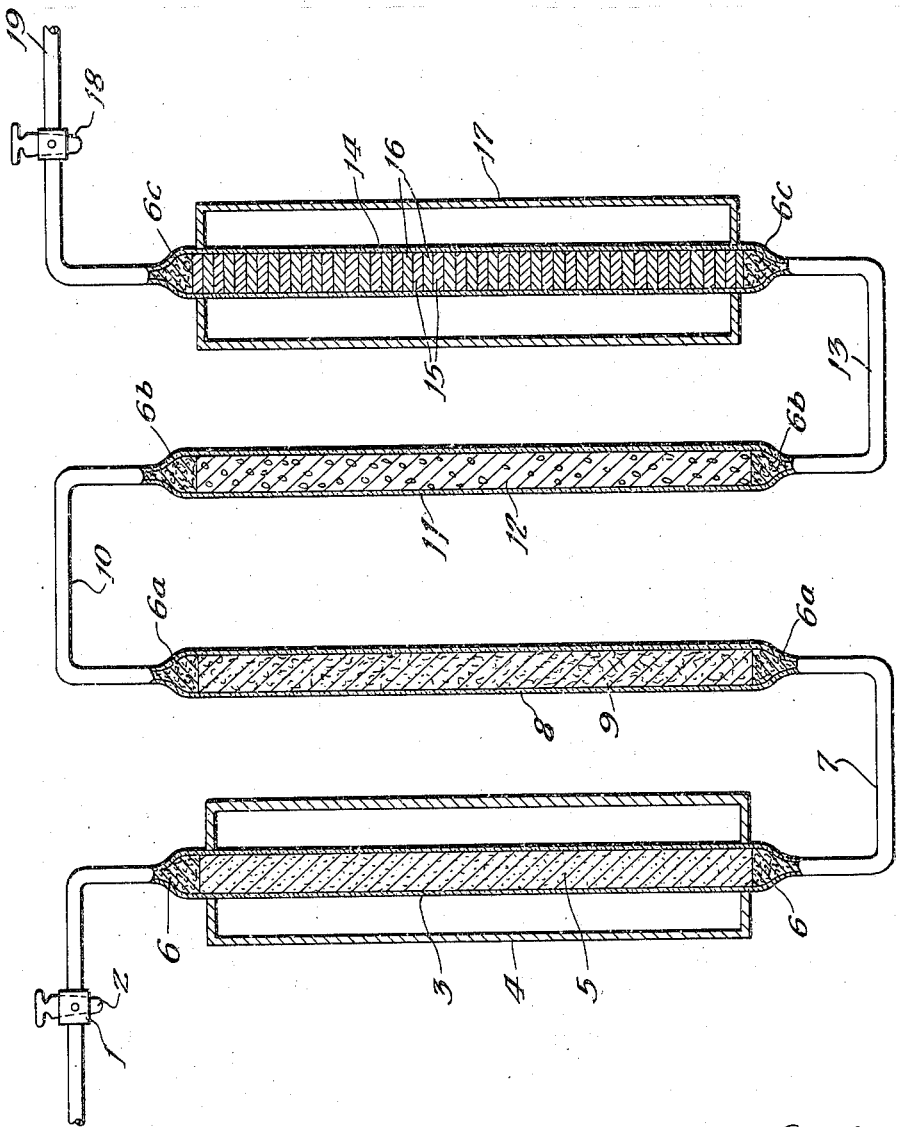
Witnesses:
Herbert E. Metcalf
Inventor:
Amos S. Newton
By: Robert A. Lavender
Attorney Patented Nov. 8, 1949

2,487,360

UNITED STATES PATENT OFFICE 2,487,360

NITROGEN PURIFICATION PROCESS

Amos S. Newton, Ames, Iowa, assignor to the United States of America as represented by the United States Atomic Energy Commission Application March 3, 1945, Serial No. 580,784

5 Claims. (Cl. 23—220)

The present invention relates to a process of purifying nitrogen. It particularly relates to a method of removing oxygen from nitrogen.

In handling certain highly reactive materials, it is of great importance that they be handled in an entirely inert atmosphere. Thus, for example, halides of uranium are seriously contaminated by the presence of even minute quantities of oxygen. These substances are frequently handled in an atmosphere of pure nitrogen. The presence of even a very small amount of oxygen or other impurities, such as hydrocarbon oils, water, carbon monoxide or carbon dioxide will contaminate them. This contamination may be serious when it is desired to obtain uranium halides of very high purity for spectroscopic study or other purposes.

It is an object of the present invention to provide a process of purifying nitrogen, to an extremely high degree of purity.

It is a particular object of the present invention to remove all traces of oxygen from nitrogen.

Production of nitrogen which is substantially free from impurities has always presented a difficult problem to the prior art since commercial nitrogen, such as that made by fractional distillation of liquid air or by burning the oxygen in air to carbon dioxide and then removing the carbon dioxide by absorption in caustic soda commonly contains oxygen as an impurity.

Probably the best prior art method of removing nitrogen from oxygen involves the use of alkaline pyrogallol which is a well known absorber for oxygen. This must then be followed by a drying agent to remove the water vapor and other absorbers to remove traces of pyrogallol and other impurities. In addition to being of limited efficiency, the alkaline pyragallol process requires the use of liquid reagents and consequently there is difficulty in handling large quantities of material.

Another prior art method of removing oxygen from nitrogen is to mix in an excess of hydrogen over the quantity of oxygen present and pass the resultant mixture over hot platinized asbestos and then through a drying agent. By this method the oxygen is converted to water which is removed by the drying agent. This method has the disadvantage that the exact amount of oxygen present first must be determined and an exact measured quantity of hydrogen added. Such a process has the disadvantageous possibility of thus introducing additional impurities.

In accordance with the present invention, a simplified method of preparing purified nitrogen has been discovered. Thus it has been found that impurities such as oxygen or other gaseous impurities commonly present in nitrogen may be effectively removed from nitrogen to an extraordinary high degree by passing the gas over uranium nitride while maintaining the nitride at an elevated temperature usually not less than 200° C. and preferably about 500 to 600° C.

The process may be conducted in conjunction with other purification processes if desired or may be used as a single purification operation. For example, nitrogen may be passed in succession over copper oxide or other agent capable of oxidizing CO and hydrocarbons to $CO_2$, then over ascarite or other caustic containing mass to absorb $CO_2$ and then into contact with a dehydrating agent such as, magnesium perchlorate or phosphorus pentoxide. Thereafter the partially purified nitrogen may be heated with a uranium nitride as herein contemplated. The uranium nitride which has a composition of about $UN_{1.5}$ to $UN_{1.75}$ removes the oxygen to an extraordinarily high degree.

The uranium nitride suitable for use may be prepared by passing ammonia gas or nitrogen over uranium turnings at about 800° C. However other reactive nitrides prepared at other temperatures may be used for the contemplated purification.

A method of making suitable uranium nitride is shown in the following example.

Example 1

About 100 grams of uranium turnings were cleaned with 1:1 nitric acid to remove surface oxide, washed with water and dried. This removes the surface oxide from the turnings. 100 grams of the clean dry turnings were then packed in a silica tube and the ends closed with rubber stoppers. The central portion of the silica tube containing the uranium turnings were placed in a furnace. Nitrogen was then run throughout the tube and the central portion containing the uranium turnings was then heated to 800° C. The rubber stoppers at the ends of the tube were protected from the heat of the furnace by glass wool. Nitrogen was passed through the turnings at 800° C. for 8 hours. The turnings were then allowed to cool still in an atmosphere of nitrogen. The product consisted of about 110 grams of uranium nitride in granular form having the approximate composition of $UN_{1.75}$.

As illustrative of the apparatus that may be used for purifying nitrogen in accordance with the present invention, reference is made to accompanying drawing.

The apparatus shown is a complete assemblage for the purifying of nitrogen. Commercial nitrogen enters the apparatus through inlet 1 in stopper 2. It passes through tower 3 which is made of a heat resistant material such as "Corning #172 glass." Tower 3 surrounded by a heating furnace 4 preferably of the electrical resistant type is kept at a temperature of 600° C. Tower 3 is filled with copper oxide 5. The copper oxide is held in place by suitable porous supports such as "Pyrex" glass wool plugs 6. The gas then passes through conduit 7 and tower 8. Tower 8 is constructed of suitable material such as "Pyrex" glass and contains ascarite 9, which is supported in the tower by "Pyrex" glass wool 6a, similar to the plugs 6. The gas then passes through conduit 10 and tower 11 which is of similar construction and contains a drying agent such as magnesium perchlorate 12. The material is also held in place by "Pyrex" glass wool plugs shown at 6b. The gas then passes through conduit 13 into tower 14 which may be of a suitable heat resistant material, such as "Corning #172 glass." Tower 14 is packed with alternate layers of approximately ¼ inch thick or less of "Pyrex" glass wool 15 and $UN_{1.75}$ 16. The entire packing is held in place by "Pyrex" glass wool plugs 6c. Tower 14 is surrounded by a furnace 17 that is maintained at a temperature of about 600° C. The purified nitrogen passes out of the system through stockcock 18 and outlet 19.

The process of the present invention is illustrated by the following example:

Example 2

An apparatus similar to that shown in Fig. 1 is used, the absorption tower being about 12 inches in length and approximately ½ inch in diameter. 110.2 grams of $UN_{1.75}$ were packed into tower 14 of Fig. 1. The $UN_{1.75}$ was the nitride prepared in accordance with Example 1 above, the nitride was packed in the tower in alternate layers of "Pyrex" glass wool nitride. This prevents the brittle nitride which may become more finely divided during the process from plugging the column. The various absorption towers were then arranged as shown in the drawing. The entire system was flushed out with nitrogen while cold and the copper oxide tower 3 and the uranium nitride 14 were heated to about 600° C.

The nitrogen containing oxygen in amount sufficient to develop a red color in a solution comprising 0.5 gram of ferrous ammonium sulphate and 0.1 gram of pyrocatechol and 100 cubic centimeters of 1 N sodium hydroxide solution was then passed through the system for purification. When about 5 lbs. per sq. in. pressure of nitrogen was placed on the nitrogen inlet 1, about 5 liters of $N_2$ per minute could be passed through the system. The nitrogen treated by this process did not contain sufficient oxygen to develop the red color in the above test.

As pointed out above, the process of the present invention often offers a simple and efficient means of purifying nitrogen to an extraordinarily high degree of purity. In fact all ordinary impurities present in nitrogen except rare gases can be removed by the simple efficient and continuous process of the present invention. The continuity of the process makes it particularly suitable for commercial production.

It is understood that the process of the present invention is not limited by any particular theory of operation but only by the following claims.

I claim:

1. In the process of purifying nitrogen, the improvement relative to removal of oxygen therefrom that comprises contacting nitrogen containing oxygen with uranium nitride said nitride being at a temperature of at least 200° C.

2. The process of obtaining substantially oxygen free nitrogen which comprises contacting a nitrogen oxygen mixture with hot uranium nitride said uranium nitride being at a temperature of about 500° to 600° C.

3. The process of obtaining nitrogen substantially free from oxygen which comprises contacting a mixture of nitrogen and oxygen with uranium nitride said uranium nitride being at a temperature of at least 200° C.

4. The process of obtaining nitrogen substantially free of oxygen which comprises contacting a mixture of nitrogen containing oxygen with uranium nitride having a formula of between about $UN_{1.5}$ and $UN_{1.75}$ said uranium nitride being at a temperature of at least 200° C.

5. The process of preparing oxygen-free nitrogen gas comprising passing nitrogen containing oxygen therein in contact with uranium nitride, said nitride being at a temperature of at least 200° C., whereby the uranium of at least part of said uranium nitride combines with said contained oxygen to form a uranium oxide and the affected uranium nitride evolves oxygen-free nitrogen gas additional to the gaseous starting material.

AMOS S. NEWTON.

REFERENCES CITED

The following references are of record in the file of this patent:

Mellor, "Comprehensive Treatise on Inorganic & Theoretical Chemistry," vol. 8, N. Y. 1928, p. 130. (Copy in Division 59.)